United States Patent
Lu et al.

(10) Patent No.: US 9,194,168 B1
(45) Date of Patent: Nov. 24, 2015

(54) UNLOCK AND AUTHENTICATION FOR AUTONOMOUS VEHICLES

(71) Applicant: Google Inc., Mountain View, CA (US)

(72) Inventors: David Tse-Zhou Lu, Menlo Park, CA (US); Calvin Karl Johnson, San Francisco, CA (US); Renaud-Roland Hubert, Gilroy, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/550,054

(22) Filed: Nov. 21, 2014

Related U.S. Application Data

(60) Provisional application No. 62/002,319, filed on May 23, 2014.

(51) Int. Cl.
  *E05F 15/20* (2006.01)
(52) U.S. Cl.
  CPC ....... *E05F 15/2046* (2013.01); *E05Y 2800/426* (2013.01); *E05Y 2900/531* (2013.01)
(58) Field of Classification Search
  USPC .......................................................... 701/49
  See application file for complete search history.

(56) References Cited

U.S. PATENT DOCUMENTS

| | | | |
|---|---|---|---|
| 5,293,160 A | 3/1994 | Kurozu et al. | |
| 6,236,333 B1 | 5/2001 | King | |
| 6,963,794 B2 * | 11/2005 | Geber et al. | 701/2 |
| 7,113,864 B2 | 9/2006 | Smith et al. | |
| 7,859,386 B2 * | 12/2010 | Lundkvist | 340/5.27 |
| 7,928,829 B2 * | 4/2011 | Hermann | 340/5.72 |
| 8,044,771 B2 | 10/2011 | Nakajima et al. | |
| 8,126,450 B2 * | 2/2012 | Howarter et al. | 455/420 |
| 8,352,112 B2 | 1/2013 | Mudalige | |

(Continued)

FOREIGN PATENT DOCUMENTS

| | | |
|---|---|---|
| EP | 2573720 A1 | 3/2013 |
| EP | 2629269 A1 | 8/2013 |

(Continued)

OTHER PUBLICATIONS

Bluetooth® Keyless, "FAQs about the Bluetooth® Passive Keyless Entry Module", copyright 2014, downloaded from <http://bluetoothkeyless.info/bluetooth-keyless-information/>.

(Continued)

*Primary Examiner* — Thomas Tarcza
*Assistant Examiner* — Alex C Dunn
(74) *Attorney, Agent, or Firm* — Lerner, David, Littenberg, Krumholz & Mentlik, LLP

(57) ABSTRACT

In one aspect, a vehicle's computing device may receive information identifying a client computing device, a pickup location, and an encryption key. When the vehicle is within a given distance of the pickup location, the computing device uses the encryption key to authenticate the client computing device. When the client computing device is authenticated, the computing device may estimate a first distance between the client computing device and the vehicle based on a strength of a signal received from the client computing device. The computing device may then automatically determine when to unlock the vehicle by selecting between a first distance value and a second distance value. The first value is selected when the first distance is greater than a threshold value, and the second value is selected when the first distance is less than the threshold value. The computing device may unlock the vehicle based on the determination.

20 Claims, 12 Drawing Sheets

(56) References Cited

U.S. PATENT DOCUMENTS

| | | | |
|---|---|---|---|
| 8,494,765 B2 * | 7/2013 | Konet et al. | 701/433 |
| 8,676,430 B1 | 3/2014 | Ferguson et al. | |
| 8,688,306 B1 | 4/2014 | Nemec et al. | |
| 8,736,438 B1 * | 5/2014 | Vasquez et al. | 340/539.11 |
| 8,768,565 B2 | 7/2014 | Jefferies et al. | |
| 9,060,003 B2 * | 6/2015 | Wang et al. | 1/1 |
| 2004/0260470 A1 | 12/2004 | Rast | |
| 2007/0073472 A1 | 3/2007 | Odinak et al. | |
| 2008/0061931 A1 * | 3/2008 | Hermann | 340/5.72 |
| 2009/0287367 A1 | 11/2009 | Salinger | |
| 2010/0075656 A1 | 3/2010 | Howarter et al. | |
| 2010/0117585 A1 | 5/2010 | Fitch et al. | |
| 2010/0286845 A1 | 11/2010 | Rekow et al. | |
| 2011/0099040 A1 | 4/2011 | Felt et al. | |
| 2011/0112969 A1 | 5/2011 | Zaid et al. | |
| 2012/0041675 A1 | 2/2012 | Juliver et al. | |
| 2012/0271500 A1 | 10/2012 | Tsimhoni et al. | |
| 2013/0231824 A1 | 9/2013 | Wilson et al. | |
| 2013/0321178 A1 | 12/2013 | Jameel et al. | |
| 2014/0156182 A1 | 6/2014 | Nemec et al. | |
| 2014/0380424 A1 * | 12/2014 | Thompson | 726/4 |
| 2015/0148989 A1 * | 5/2015 | Cooper et al. | 701/2 |

FOREIGN PATENT DOCUMENTS

| | | |
|---|---|---|
| JP | 2001234653 A | 8/2001 |
| WO | 03080391 A2 | 10/2003 |

OTHER PUBLICATIONS

Chevrolet, "OnStar Remote Link™: Control you Chevy even when you're not driving", 2014 downloaded from <http://www.chevrolet.com/onstar-remotelink.html>.

Goodwin, "Add-on module auto-unlocks your car when your phone is near", clnet, Nov. 19, 2013, downloaded from <http://www.cnet.com/news/add-on-module-auto-unlocks-your-car-when-your-phone-is-near/>.

McFadden, Colin-Druce, "Autonomous car concept swaps steering wheel for gesture controls", <http://www.dvice.com/2014-3-12/autonomous-car-concept-swaps-steering-wheel-gesture-controls>, Mar. 12, 2014.

Ridden, Paul, "ATNMBL—The concept car with no steering wheel, brake pedal or driver's seat", <http://www.gizmag.com/atnmbl-autonomous-concept-passenger-transport/15877/>, Jul. 29, 2010.

Fagnant et al., "The travel and environmental implications of shared autonomous vehicles, using agent-based model scenarios", Transportation Research Part C, vol. 40 (2014): 1-13 (the attached reference includes 22 pages).

Ranoa, "Infographic: The car that drives itself", Los Angeles Times, copyright 2014,<http://www.latimes.com/la-sci-g-google-self-driving-car-20140528-htmlstory.html>.

McKeegan, "Autonomous taxi can be hailed with and iPad app", Oct. 14, 2010, downloaded from <http://www.gizmag.com/autonomous-taxi-ipad/16649/>.

Baydere et al., "MR 302: The Future of the Automobile: Car-Sharing Service using Autonomous Automobiles" Spring 2014.

International Search Report and Written Opinion for Application No. PCT/US2015/032181 dated Sep. 4, 2015.

\* cited by examiner

800

UNLOCK AND AUTHENTICATION FOR AUTONOMOUS VEHICLES

CROSS REFERENCE TO RELATED APPLICATIONS

The present application claims the benefit of the filing date of U.S. Provisional Patent Application No. 62/002,319 filed May 23, 2014, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

BRIEF SUMMARY

One aspect of the disclosure provides a method. The method includes receiving, by one or more computing devices, information assigning a vehicle to a client computing device and a pickup location for the client computing device. The information also includes an encryption key for authenticating a client computing device to the vehicle. The method also includes, when the vehicle is within a given distance of the pickup location, using, by the one or more computing devices, the encryption key to authenticate the client computing device to the vehicle; when the client computing device is authenticated, estimating a first distance, by the one or more computing devices, between the client computing device and the vehicle based on a strength of a signal received from the client computing device; determining, by the one or more computing devices, when to unlock the vehicle by selecting between a first distance value and a second distance value, wherein the first distance value is selected when the first distance is greater than a threshold value and the second distance value is selected when the first distance is less than a threshold value, and the first distance value is different from the second distance value; and automatically unlocking the vehicle, by the one or more computing devices, based on the determination.

In one example, the first distance is greater than the threshold value, and the method also includes estimating a second distance, by the one or more computing devices, between the client computing device and the vehicle based on a strength of a signal received from the client computing device after the client computing device is authenticated and comparing the second distance to the first distance value. This second distance is less than the first distance, and automatically unlocking the vehicle is further based on the comparison. In addition, automatically unlocking the vehicle is further based on whether the second distance is less than or equal to the first distance value.

In another example, the first distance is greater than the threshold value, and the method also includes estimating a second distance, by the one or more computing devices, between the client computing device and the vehicle based on a strength of a signal received from the client computing device after the client computing device is authenticated and comparing the second distance to the second distance value. This second distance is less than the first distance and automatically unlocking the vehicle is further based on the comparison. In addition, automatically unlocking the vehicle is further based on whether the second distance is less than or equal to the second distance value.

In another example, the vehicle includes a plurality of directional antennas and estimating the first distance includes identifying an antenna of the plurality that receives strongest signal strength. In another example, the second distance value is less than the first distance value. In another example, the information also includes a destination location, and the method also includes, after unlocking the vehicle, autonomously maneuvering the vehicle to the destination location.

Another aspect of the disclosure provides a system. The system includes one or more computing devices configured to receive information assigning a vehicle to a client computing device and a pickup location for the client computing device. The information also includes an encryption key for authenticating a client computing device to the vehicle. The one or more computing devices are also configured to, when the vehicle is within a given distance of the pickup location use the encryption key to authenticate the client computing device to the vehicle; when the client computing device is authenticated, estimate a first distance between the client computing device and the vehicle based on a strength of a signal received from the client computing device; determine when to unlock the vehicle by selecting between a first distance value and a second distance value, wherein the first distance value is selected when the first distance is greater than a threshold value and the second distance value is selected when the first distance is less than a threshold value, and the first distance value is different from the second distance value; and automatically unlock the vehicle based on the determination.

In one example, the first distance is greater than the threshold value, and the one or more computing devices are also configured to estimate a second distance between the client computing device and the vehicle based on a strength of a signal received from the client computing device after the client computing device is authenticated and compare the second distance to the first distance value. This second distance is less than the first distance, and automatically unlocking the vehicle is also based on the comparison. In addition, the one or more computing devices are also configured to automatically unlock the vehicle further based on whether the second distance is less than or equal to the first distance value.

In another example, the first distance is greater than the threshold value and the one or more computing devices are also configured to estimate a second distance between the client computing device and the vehicle based on a strength of a signal received from the client computing device after the client computing device is authenticated and compare the second distance to the second distance value. This second distance is less than the first distance, and automatically unlocking the vehicle is also based on the comparison. In addition, the one or more computing devices are also configured to automatically unlocking the vehicle further based on whether the second distance is less than or equal to the second distance value.

In another example, the vehicle includes a plurality of directional antennas and the one or more computing devices are also configured to estimate the first distance includes identifying an antenna of the plurality that receives strongest signal strength. In another example, the second distance value is less than the first distance value. In another example, the information further includes a destination location, and the one or more computing devices are also configured to, after unlocking the vehicle, autonomously maneuvering the vehicle to the destination location. In another example, the system also includes the vehicle.

A further aspect of the disclosure provides a tangible, non-transitory recording medium on which instructions are stored. The instructions when executed by one or more processors cause the one or more processors to perform a method. The method includes receiving information assigning a vehicle to a client computing device and a pickup location for the client computing device. The information also includes an encryption key for authenticating a client computing device to the vehicle. The method also includes when the vehicle is within a given distance of the pickup location using the encryption key to authenticate the client computing device to the vehicle; when the client computing device is authenticated, estimating a first distance between the client computing device and the vehicle based on a strength of a signal received from the client computing device; determining when to unlock the vehicle by selecting between a first distance value and a second distance value, wherein the first distance value is selected when the first distance is greater than a threshold value and the second distance value is selected when the first distance is less than a threshold value, and the first distance value is different from the second distance value; and automatically unlocking the vehicle based on the determination.

In one example, the first distance is greater than the threshold value and the method also includes estimating a second distance between the client computing device and the vehicle based on a strength of a signal received from the client computing device after the client computing device is authenticated and comparing the second distance to the first distance value. This second distance is less than the first distance, and automatically unlocking the vehicle is further based on the comparison. In addition, automatically unlocking the vehicle is further based on whether the second distance is less than or equal to the first distance value.

DETAILED DESCRIPTION

Overview

Figure 1:
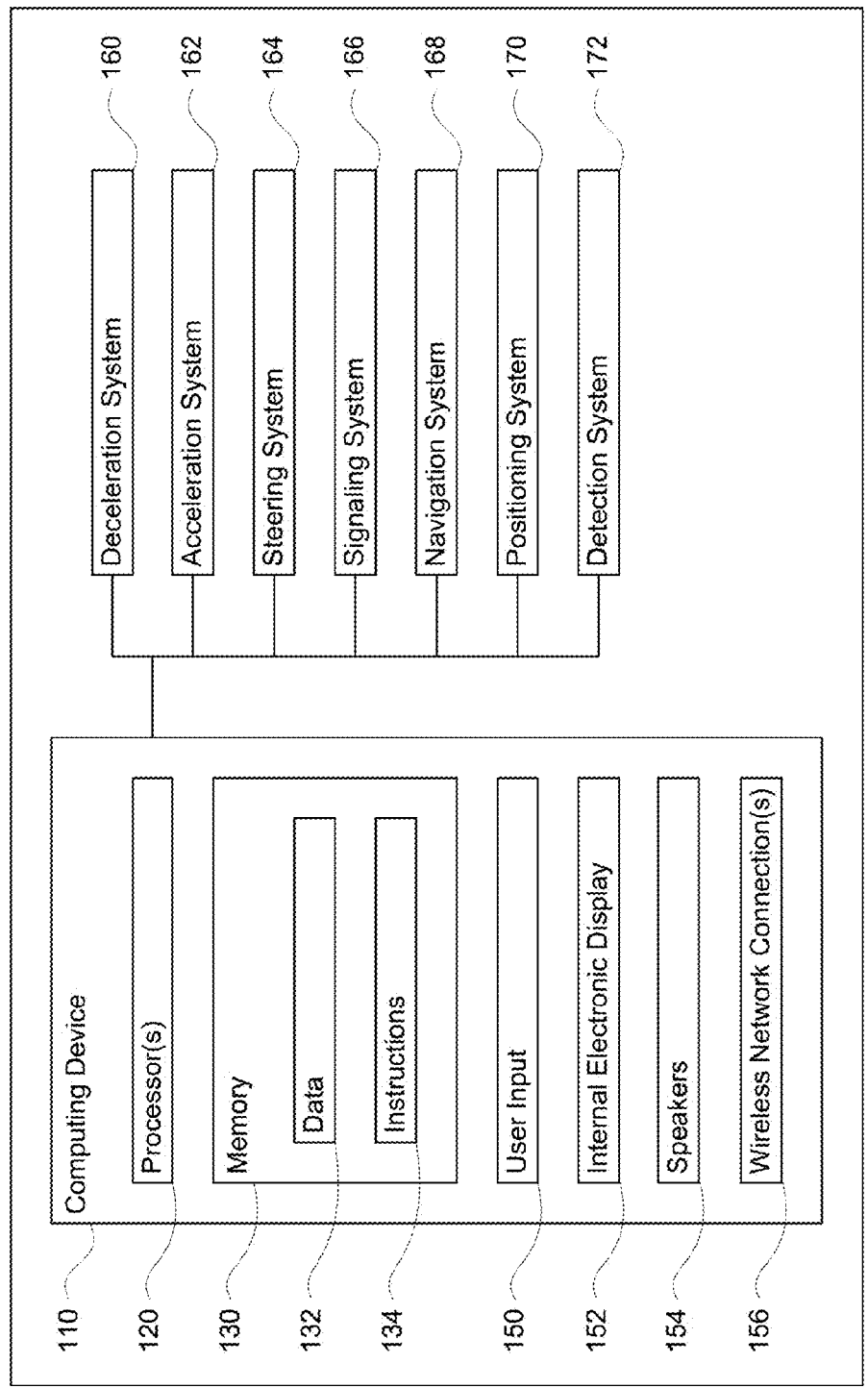
FIG. 1 is a functional diagram of an example vehicle in accordance with an exemplary embodiment.

The technology relates to autonomous vehicle for maneuvering a user or passenger to a destination, for example taking a trip, autonomously. In order to do so, the user may provide a pickup location and a destination location for the trip to a centralized dispatching system via a client computing device, such as a mobile phone. The centralized dispatching system may then dispatch a vehicle to the pickup location. However, once the vehicle has arrived at the pickup location, the vehicle may need to authenticate the user (or user's client computing device) before unlocking the vehicle's doors and allowing the user to enter.

In order to do so, the dispatching system, via a server computing device, may provide the client computing device and the vehicle with a pair of encryption keys for authentication. As the vehicle approaches or after arriving at the pickup location, it may attempt to communicate with the client computing device, exchange keys, and authenticate the client computing device for example using a Bluetooth or LAN connection. Once the user is authenticated, the vehicle may unlock its doors and allow the user to enter and initiate the trip.

In some aspects, when the vehicle unlocks the doors may be based upon an estimated distance between the client computing device and the vehicle. For example, when the user is within some first distance of the vehicle, depending on the strength of the signal from the client computing device, the user's client computing device and the vehicle may be able to pair and authenticate the user. Once authenticated to the vehicle, the vehicle would unlock its doors when the client computing device reaches some second distance from the vehicle and allow the passenger to enter the vehicle.

The second distance may be selected based upon an estimation of the first distance. The first distance may be estimated by the vehicle's computing devices using a plurality of directional antennas. By determining which directional antenna is receiving the strongest signal from the client computing device and the strength of that strongest signal, the vehicle's computing devices may determine on which side of the vehicle and how far away the client computing device is located from the vehicle. As such, the vehicle's computing devices may estimate the first distance. However, in some cases, the signal strength can relate to antenna direction on the client computing device and any obstacles between the client computing device and the vehicle. In at least some cases, the client computing device may provide the vehicle with information about the orientation of the antenna.

As noted above, the estimated first distance may be used to select the second distance. For example, if the first distance is greater than a first threshold, then the vehicle's computing device the vehicle may select a first value for the second distance. If the first distance is less than the first threshold value, the second distance may be selected to be a second value that is smaller than the first value.

Accordingly, when the vehicle estimates that the client computing device is within the second distance from the vehicle as described above, the vehicle may unlock its doors.

In some cases, the authentication may fail before the user reaches the vehicle. If so, the passenger may select an option on her phone to unlock the vehicle. In one approach, the client computing device may attempt to communicate directly with the vehicle again in order to unlock the doors. Alternatively, a message may be relayed to a customer support representative and/or the server computing device which could unlock the doors. However, such an approach requires the vehicle to be within a data zone. If this attempt fails, the passenger may try again. If the vehicle does not unlock the doors within some additional amount of time, the ride may be automatically cancelled.

The features described above allow the vehicle to unlock its doors before the user actually reaches the vehicle. In addition, these features allow the vehicle to avoid doing so too quickly and without requiring user input. For example, if there are a number of obstructions, such as other people, in the area and the authentication occurs when the user is very close to the vehicle, the features described above allow the vehicle to unlock its doors when the user is likely to have moved around such people but still before the user reaches the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 170 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and detection system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
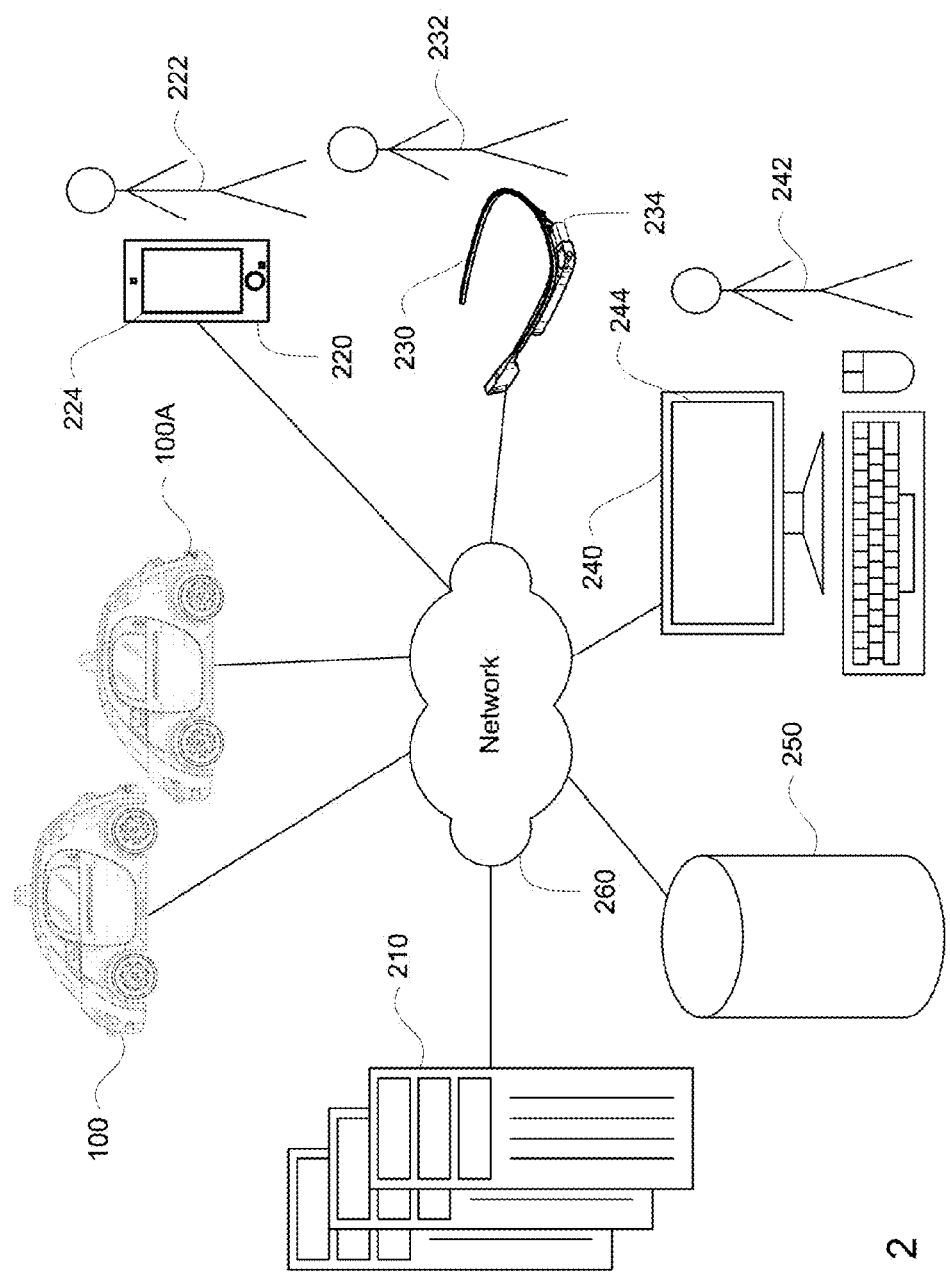
FIG. 2 is a functional diagram of an example system in accordance with an exemplary embodiment.
Figure 3:
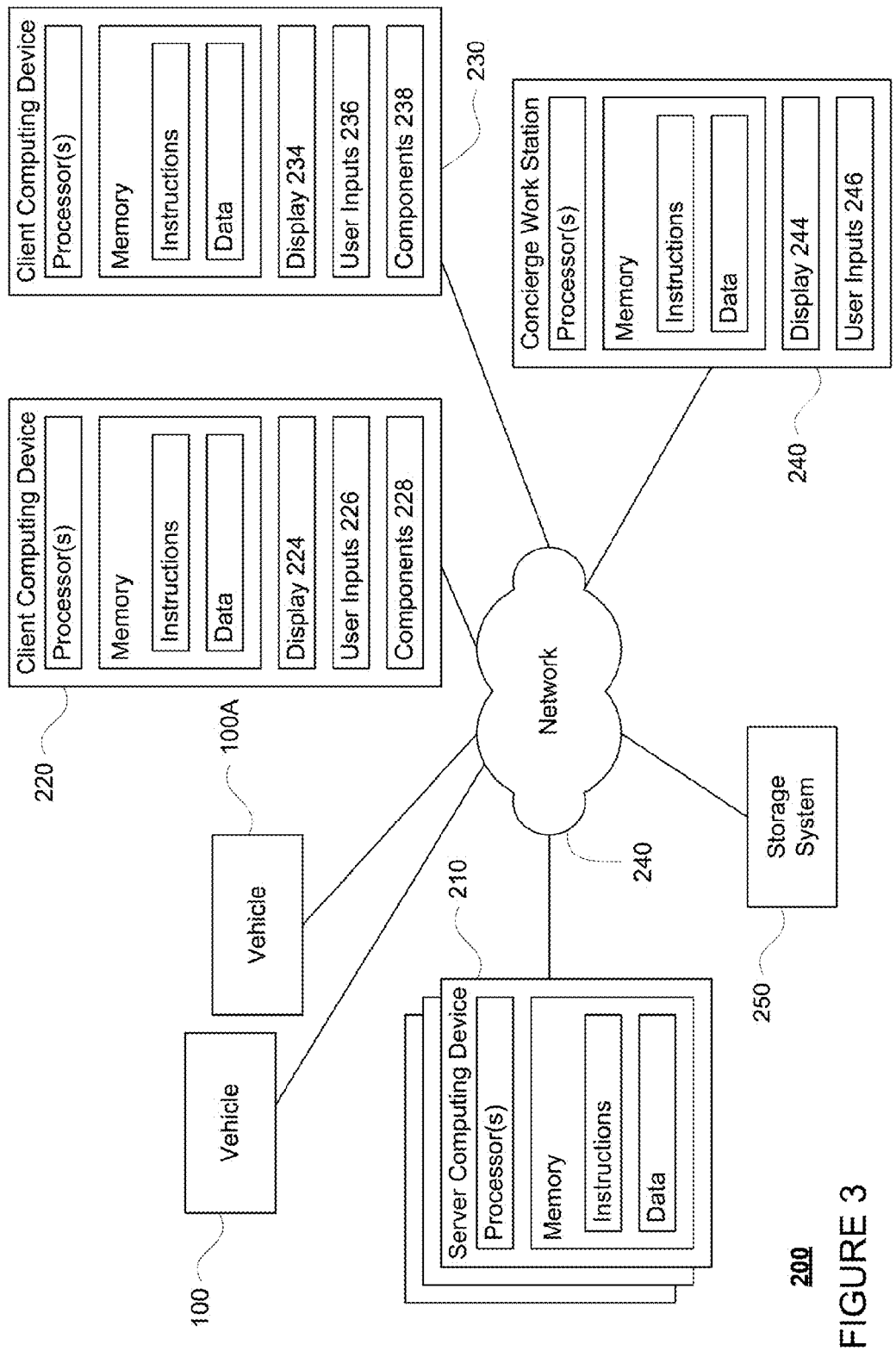
FIG. 3 is a pictorial diagram of the system of FIG. 2 in accordance with aspects of the disclosure.
Figure 4A:
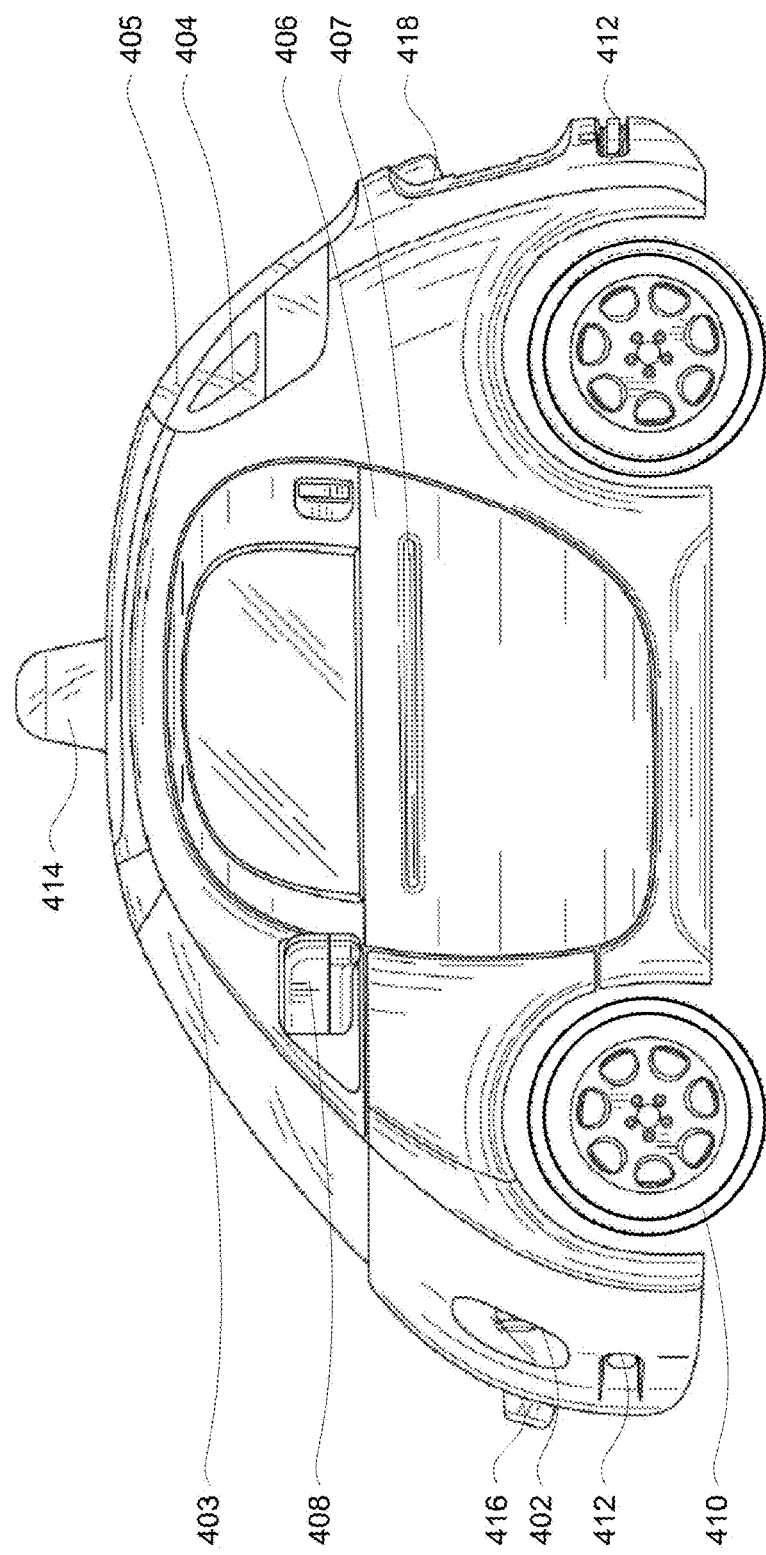
FIGS. 4A-4D are example external views of a vehicle in accordance with aspects of the disclosure.
Figure 4C:
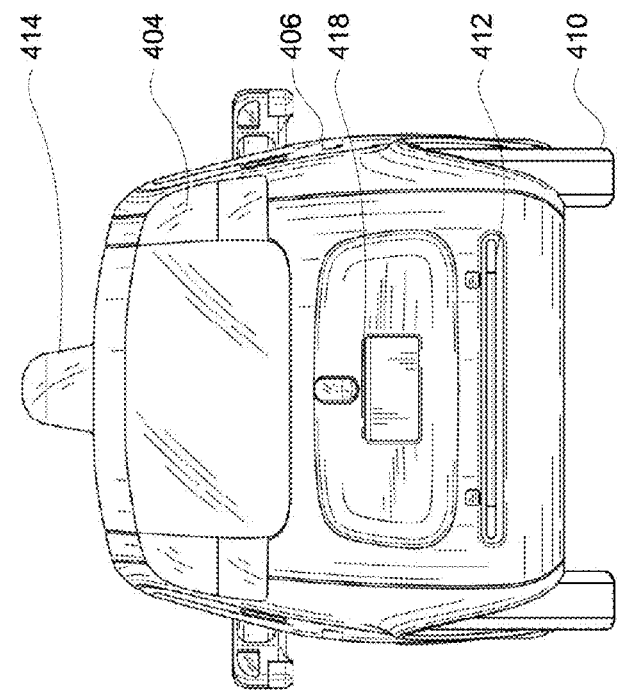
Figure 4B:
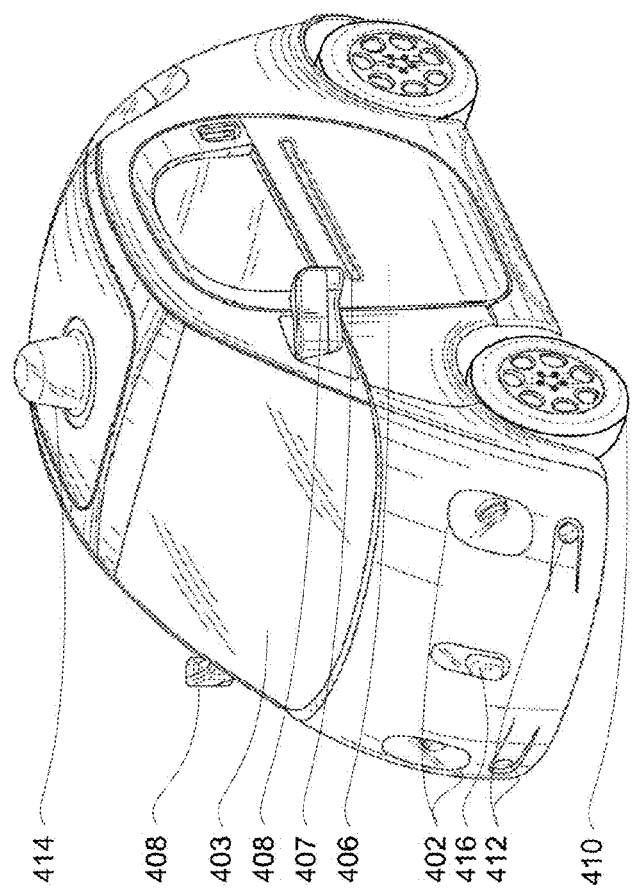
Figure 4D:
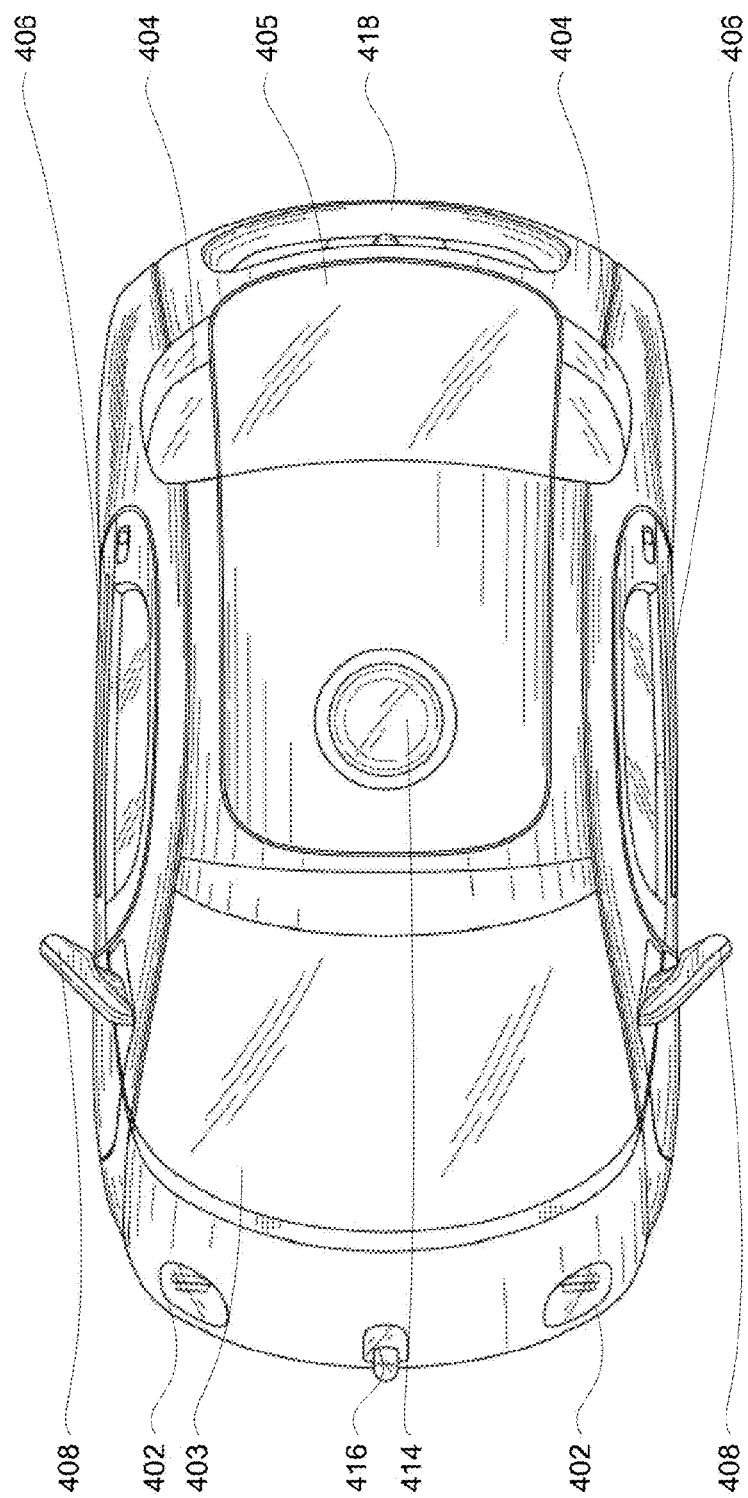

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232, 242 on a display, such as displays 224, 234, 242 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touch-screen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a head-mounted computing system in FIG. 2. As an example the user may input information using a small keyboard, a keypad, microphone, using visual signals with a camera, or a touch screen.

In some examples, client computing device 240 may be a concierge work station used by an administrator or customer support representative (concierge) to provide concierge services to users such as users 222 and 232. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 260 as shown in FIG. 2 and/or may be directly connected to or incorporated into any of the computing devices 110, 210, 220, 230, 240, etc.

FIGS. 4A-4D are examples of external views of vehicle 100. As can be seen, vehicle 100 includes many features of a typical vehicle such as headlights 402, windshield 403, taillights/turn signal lights 404, rear windshield 405, doors 406, side view mirrors 408, tires and wheels 410, and turn signal/parking lights 412. Headlights 402, taillights/turn signal lights 404, and turn signal/parking lights 412 may be associated the signaling system 166. Light bar 407 may also be associated with the signaling system 166.

Vehicle 100 also includes sensors of the detection system 172. For example, housing 414 may include one or more laser devices for having 360 degree or narrower fields of view and one or more camera devices. Housings 416 and 418 may include, for example, one or more radar and/or sonar devices. The devices of the detection system may also be incorporated into the typical vehicle components, such as taillights 404 and/or side view mirrors 408. Each of these radar, camera, and lasers devices may be associated with processing components which process data from these devices as part of the detection system 172 and provide sensor data to the computing device 110.

Figure 5:
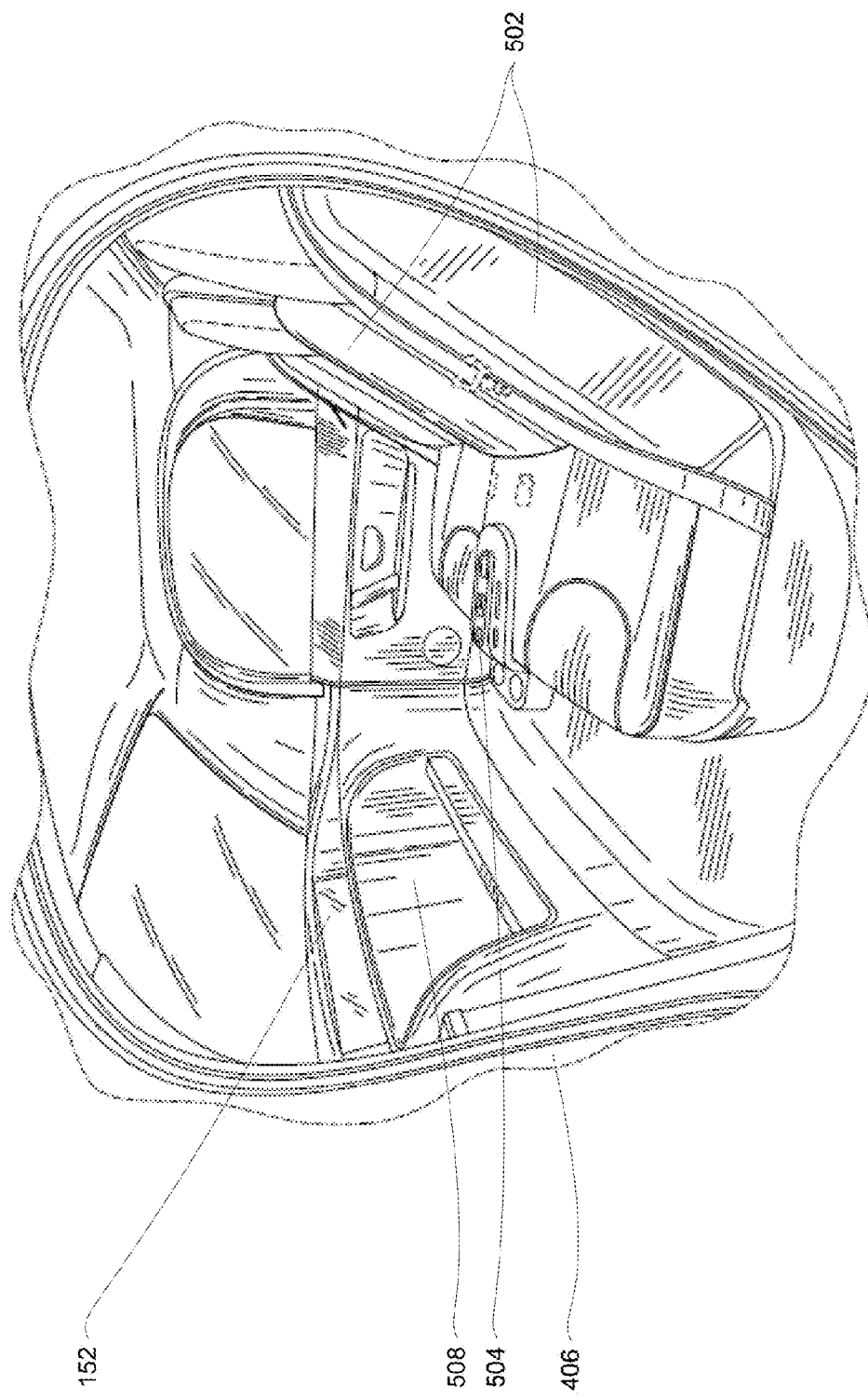
FIG. 5 is an example internal view of a vehicle in accordance with aspects of the disclosure.

FIG. 5 is an example internal view of vehicle 100 through the opening of door 406. In this example, there are two seats 502 for passengers with a console 504 between them. Directly in ahead of the seats 502 is a dashboard configuration 506 having a storage bin area 508 and the internal electronic display 152. As can be readily seen, vehicle 100 does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 504, and wireless network connections 156. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

Figure 6:
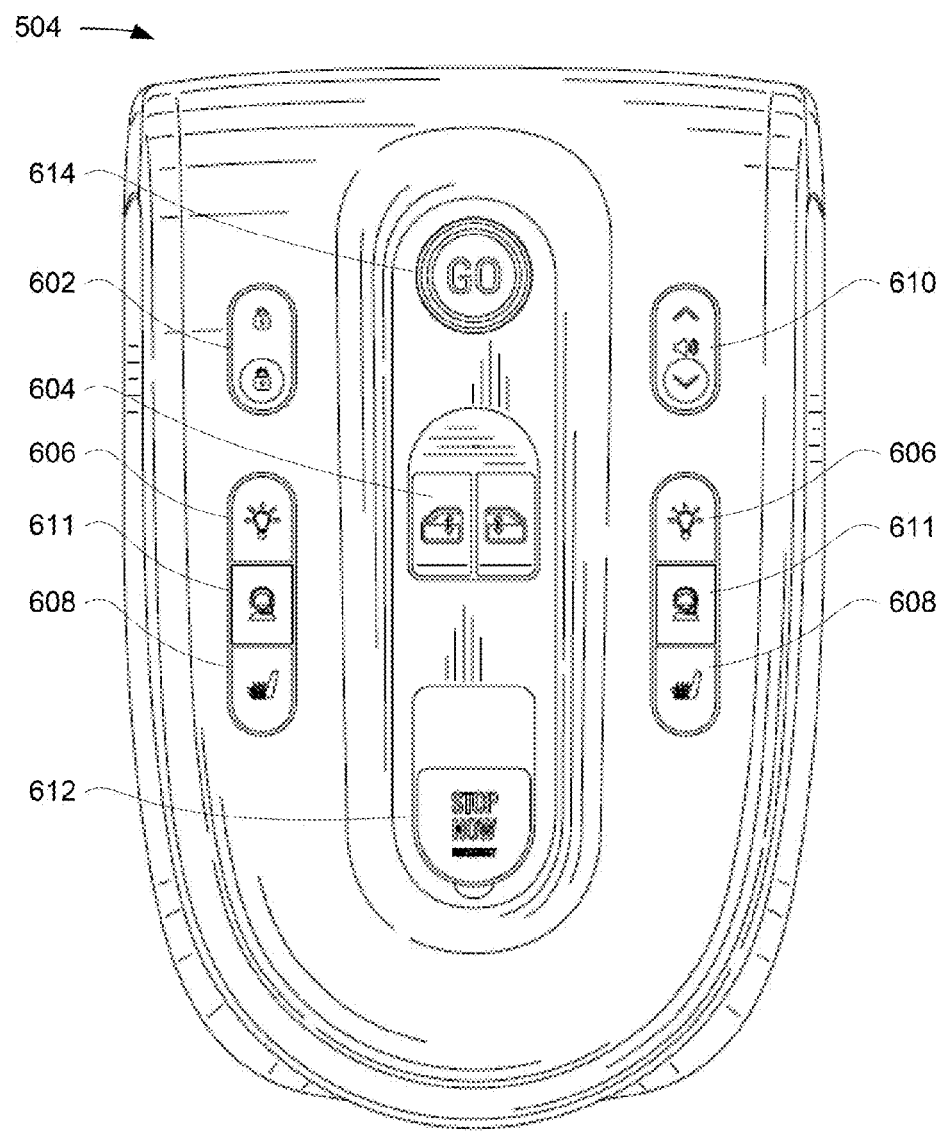
FIG. 6 is an example of a console of a vehicle in accordance with aspects of the disclosure.

FIG. 6 is a top down view of the console 504. Console 504 includes various buttons for controlling features of vehicle 100. For example, console 504 includes buttons that may be found in a typical vehicle such as buttons 602 for locking and unlocking the doors 406, buttons 604 for raising or lowering the windows of doors 406, buttons 606 for turning on internal lights of the vehicle, buttons 608 for controlling a heating function of seats 502, as well as buttons 610 for controlling the volume of speakers 154.

In addition, console 504 also includes buttons 611 for initiating communication with concierge 242 via one of the wireless network connections 156. Once the concierge work station is connected to the vehicle, the concierge may communicate with the passenger via the speakers 154 and/or internal electronic display 152. In addition, the microphone allows the passenger to speak directly to the concierge. In some cases, vehicle 100 may include an internal still or video camera that allows the concierge to view the status of the passengers and confirm their safety.

Buttons 612 and 614 may also be a part of user input 150 and in this regard, allow a passenger to communicate with computing device 110, for example, to initiate or end a trip in the vehicle. In this regard, button 612 may act as an emergency stopping button that, when pushed, causes vehicle 100 to stop in a short amount of time. Because the passenger does not have direct control of the acceleration or deceleration of vehicle 100 by way of a gas or brake pedal, button 612 may be an emergency stop button that is critical to allowing a passenger to feel safe and act quickly in case of an immediate emergency. In addition, because of the potentially abrupt nature of a stop initiated by the emergency stopping button 612, the emergency stopping button 612 may feature a cover (e.g., a clear plastic cover) that may have to be removed or flipped up in order to activate button 612.

Button 614 may be a multi-function button having different states. In the first state, button 614 may be a "GO" button which a passenger uses to initiate a trip to a destination. Once vehicle 100 is moving, button 614 may change to a "PULL OVER" button which a passenger users to initiate a non-emergency stop. In this regard, computing device 110 may respond by determining a safe place to pull the vehicle over, rather than coming to a more sudden stop as with the emergency stop button 612. Alternatively, two buttons, one having a "GO" state and the other having a "PULL OVER" state may be used.

Thus, passenger communication with computing device 110 for navigation purposes may be limited to button 614 (or two buttons as in the example above), emergency stopping button 612, wireless network connection 156 (such as Bluetooth LE) with the passenger's client computing device, and by sending information from the passenger's client computing device to the server 210 which then relays that information to the vehicle's computing device. In some examples, a passenger may provide information to the vehicle's computing device 110 via voice commands though the microphone as discussed above. In addition, however, the passenger may communicate with the concierge via a phone call, an application on the passenger's client computing device, a microphone, and/or the concierge button 611 and in turn, the concierge may provide instructions control certain aspects of a vehicle via a concierge work station.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application via a link in an email, directly from a website, or an application store to client computing devices 220 and 230. For example, client computing device may transmit a request for the application over the network, for example, to one or more server computing devices 210, and in response, receive the application. The application may be installed locally at the client computing device.

The user may then use his or her client computing device to access the application and request a vehicle. As an example, a user such as user 232 may use client computing device 230 to send a request to one or more server computing devices 210 for a vehicle. The request may include information identifying a pickup location or area and/or a destination location or area. As an example, such location may be identified by street addresses, location coordinates, points of interest, etc. In response the one or more server computing devices 210 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Figure 7:
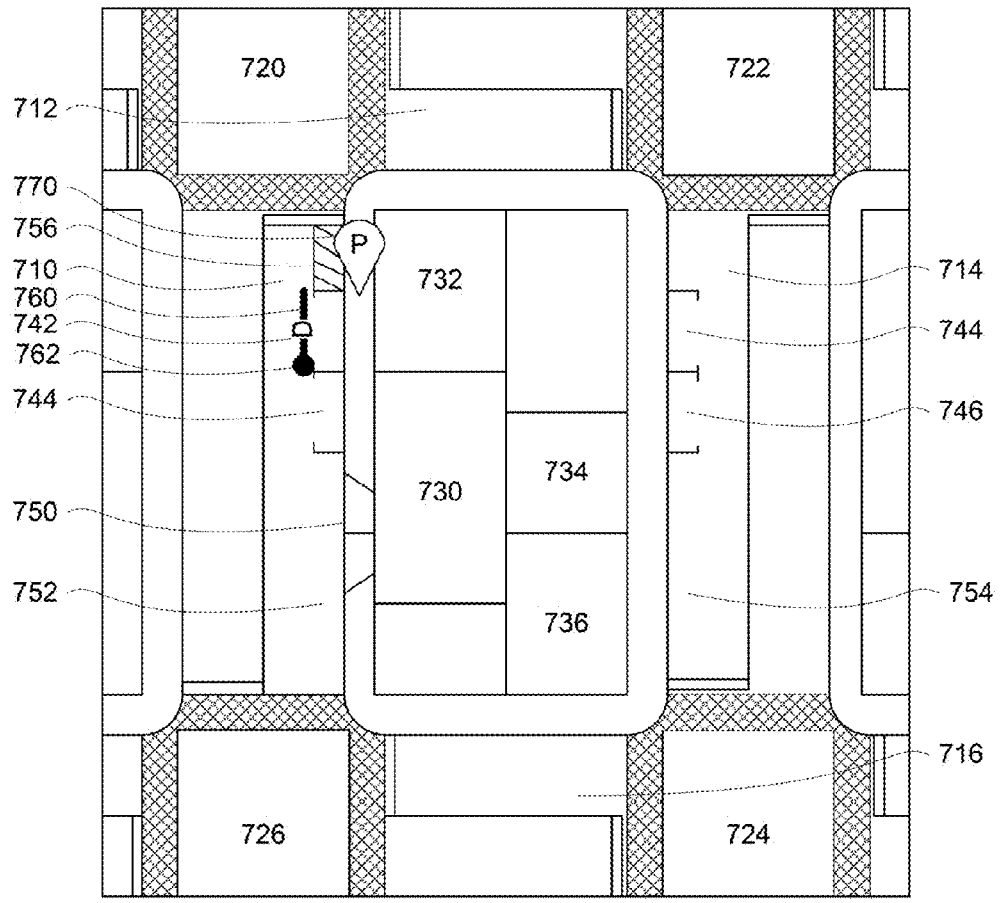
FIG. 7 is an example map in accordance with aspects of the disclosure.

FIG. 7 is an example of a map 700. In this example, the map includes a plurality of different features that identify the shape and location of various features such as lanes 710-716, intersections 720-726, buildings 730-736, parking spaces 740-746, a driveway entrance (for example to a parking garage or other location) 750, shoulder areas 752-754, and no parking zone 756. Together, these features correspond to a single city block. The map 700 may be a part of the detailed maps described above and used by the various computing devices of vehicle 100 in order to maneuver the vehicle 100.

Once the vehicle 100 receives the information dispatching the vehicle, the vehicle's computing device 110 may use the map 700 to identify the pickup location relative to the current location of the vehicle. For example, map 700 also includes a map pointer 770 corresponding to a pickup location P for user 232 and/or client device 230. The vehicle's computing device 110 may then maneuver the vehicle towards the pickup location using the various features described above.

In addition to the pickup location and information identifying the client computing device, the one or more server computing devices may also provide the vehicle's computing device with authentication information. This authentication information may allow the vehicle's computing device to authenticate the user's client computing device when the vehicle is within a certain distance of the client computing device. This certain distance may depend upon the strength of a wireless signal from the client computing device.

The authentication information may include pairing information for authenticating the client computing device using near field communication, Wi-Fi, Bluetooth, local area network, or other short range communication methods. For example, the client computing device and the assigned vehicle may be paired prior to when the vehicle is within the certain distance such as when the vehicle is initially assigned or dispatched to the user. In that regard, the client computing device may be "pre-paired" with the vehicle. This may obviate the need for the user to manually pair a client computing device with a vehicle each time a new vehicle is assigned to that client computing device. In one instance, once a vehicle is assigned to a client computing device, the one or more server computing devices may send the client computing device location information associated with the assigned vehicle and an encryption key. The one or more server computing devices may also send the encryption key to the assigned vehicle.

In this example, in order to authenticate the client computing device, the vehicle's computing device may then actively "listen for" and detect the client computing device via the encryption key. The client computing device may also actively listen for and detect the assigned vehicle. When the client computing device is located, the keys may be matched and the assigned vehicle may pair with the client computing device prior to or as the user approaching the vehicle.

In another example, a client computing device and an assigned vehicle may be pre-paired using a "virtual device." The virtual device may be an arbitrary, virtual representation of a device, e.g., Bluetooth address, passcode, bits, bytes, etc. that is assigned to a particular user (or user's client computing device). In this regard, the one or more server computing devices may associate the virtual device with the client computing device. When a vehicle is assigned to the client computing device, the one or more server computing devices may send information to the assigned vehicle regarding the association between the virtual device and the client computing device.

In this example, in order to authenticate the client computing device, vehicle may then configure itself to the specifications of the virtual device in order to allow the client device to locate and identify the virtual device, and ultimately the vehicle. In that regard, pairing information may be sent only to the assigned vehicle so that the assigned vehicle pairs with the correct client computing device based on the association between the virtual device and the client computing device.

The example authentication methods described above allow a client computing device and an assigned autonomous vehicle to be pre-paired before a user approaches the assigned vehicle or before the user starts interacting with the vehicle via the client computing device. In that regard, a user may not need to manually pair his or her client computing device every time a new autonomous vehicle is assigned to the client computing device.

As noted above, the vehicle's computing devices may maneuver the vehicle to the pickup location. Once the vehicle is within some predetermined distance of the pickup location, such as 30 meters or more or less, or after arriving at the pickup location, the vehicle's computing device 110 may attempt to authenticate the client computing device using, for example, any of the authentication methods described above. For example, returning to FIG. 7, point 762 may represent a location that is the predetermined distance D, shown along line 760, from the pickup location P.

Figure 8:
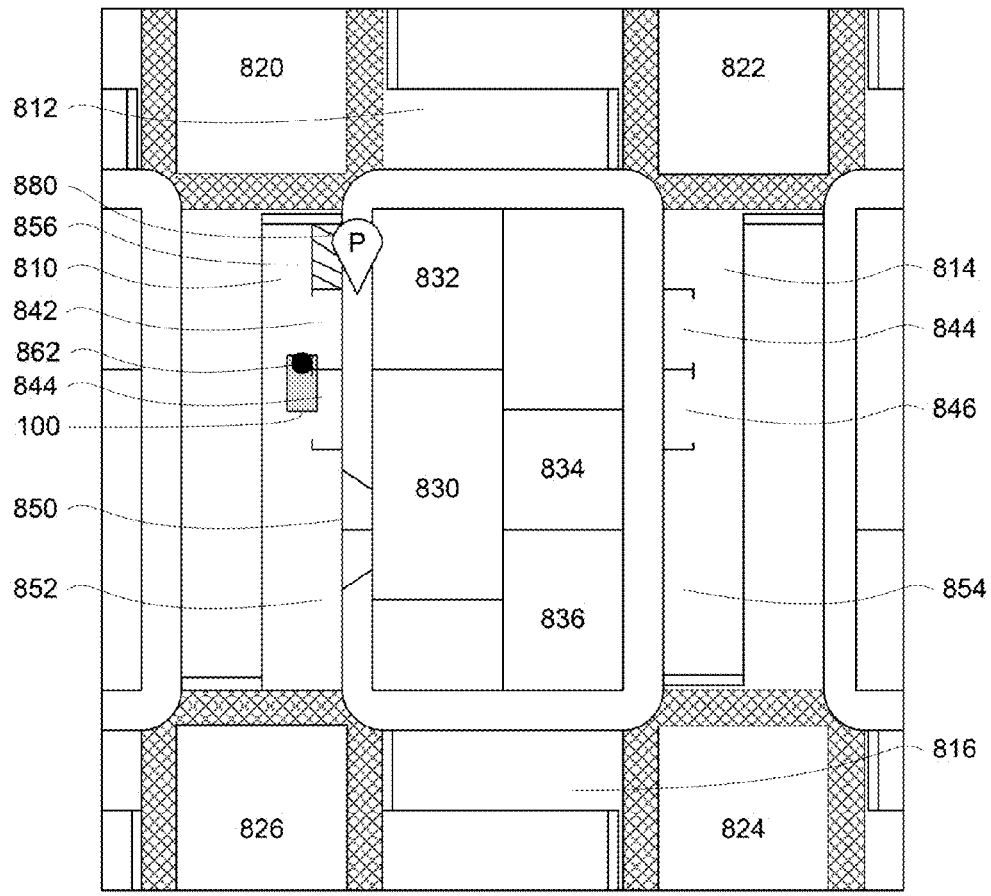
FIG. 8 is an example bird's eye view of a geographic area in accordance with aspects of the disclosure.

FIG. 8 is an example of a bird's eye view 800 of a geographic area 802 corresponding to the area of map 700. In this example, the geographical area includes various features such as lanes 810-816, intersections 820-826, buildings 830-836, parking spaces 840-846, a driveway entrance (for example to a parking garage or other location) 850, shoulder areas 852-854, and no parking zone 856 that correspond to each of lanes 710-716, intersections 720-726, buildings 730-736, parking spaces 740-746, a driveway entrance (for example to a parking garage or other location) 750, shoulder areas 752-754, and no parking zone 756 of the map 700. In this example, map pin 880 is for reference only and identifies the physical location of pickup location P. Similarly, point 862 is for reference only and identifies the physical location of location 762. Thus, once the vehicle 100 reaches point 862 in lane 810 (traveling away from intersection 826 and towards intersection 820) the vehicle's computing device 110 may attempt to authenticate the user's client computing device 220.

Figure 9:
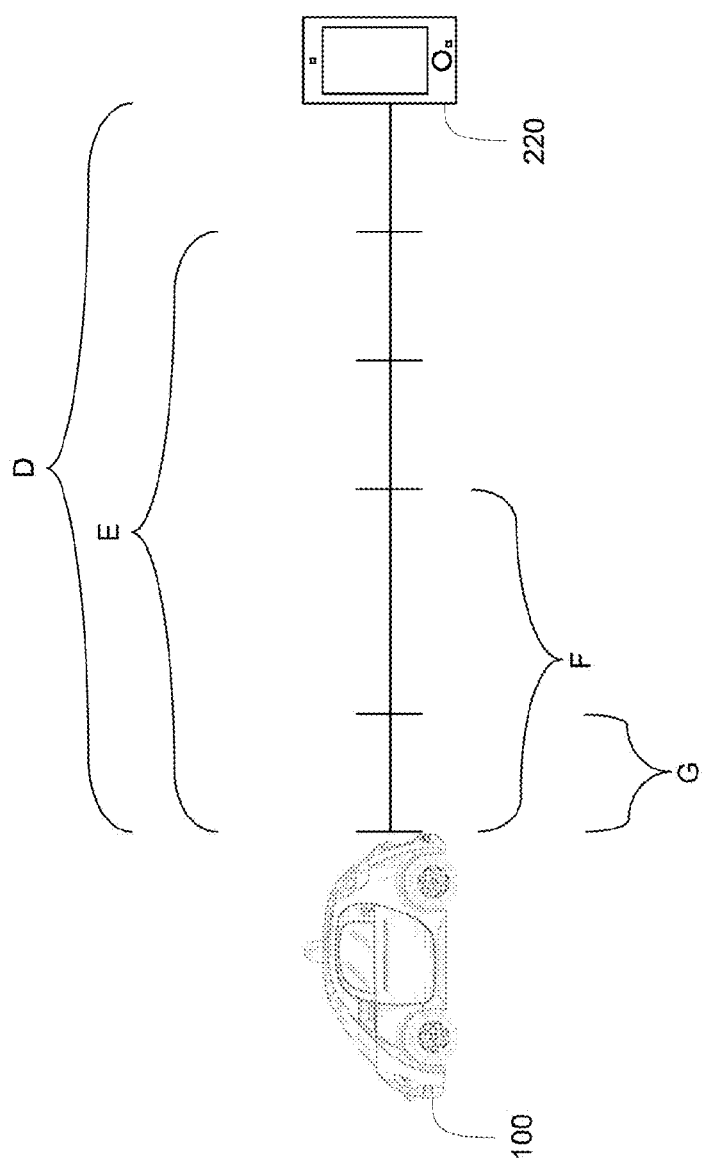
FIG. 9 is an example of a client computing device and vehicle in accordance with aspects of the disclosure.

Example 900 of FIG. 9 depicts the client computing device 200 being distance D from the vehicle 100. Again, the distance D corresponds to the predetermined distance where the vehicle's computing device 100 begins to attempt to authenticate the client computing device (or the distance D along line 760 as shown in FIG. 7).

When the user is authenticated, the vehicle's computing devices may automatically unlock the vehicle's doors and allow the user to enter the vehicle. The vehicle's computing device 110 may also display a welcome screen on the internal electronic display 152. This welcome screen may provide instructions to the user (now a passenger) on how to use the vehicle. For example, the instructions may include requesting that the passenger shut the doors 406 if needed and buckle his or her seatbelt. Sensors associated with the seats, doors, and seatbelts may be used to determine if the passenger has complied. Once the passenger has complied with the instructions, he or she may press or otherwise activate button 614. In response, the computer 110 may initiate the necessary systems to control the vehicle autonomously to the destination location.

In some aspects, when the vehicle unlocks the doors may be based upon an estimated distance between the client computing device and the vehicle when the client computing device is authenticated. This distance may be estimated by the vehicle's computing device 110 using a plurality of directional antennas (not shown). By determining which directional antenna is receiving the strongest signal from the client computing device 220 and the strength of that strongest signal, the vehicle's computing device 110 may determine on which side of the vehicle and how far away the client computing device is located from the vehicle. As such, the vehicle's computing devices may estimate the distance between the client computing device and the vehicle when the client computing device is authenticated (or immediately thereafter), hereafter, "the first distance." However, in some cases, the signal strength can relate to antenna direction on the client computing device and any obstacles between the client computing device and the vehicle. In at least some cases, the client computing device may provide the vehicle's computing device with information about the orientation of the antenna.

Once the vehicle's computing device has authenticated the client computing device and determined the first distance, the computing device may unlock the vehicle's doors when the client computing device reaches some second distance from the vehicle. In this regard, the vehicle's computing device 110 may continue to determine the current distance between the vehicle and the client computing device as the client computing device approaches the vehicle using the techniques described above and compare this "current" distance to the second distance. Once the client computing device is at or within the second distance from the vehicle, the vehicle's computing device may automatically unlock the vehicle's doors allowing the user to enter and initiate a trip to the destination location as described above.

The second distance may be selected based upon the first distance. For example, the first distance may be compared to a first threshold value. If the first distance is greater than the first threshold, such a 25 meters or more or less, the vehicle's computing device may select a first value for the second distance, such as 10 meters or more or less.

Returning to FIG. 9, distance E may represent this first threshold. If the client computing device is authenticated between E and D distance from the vehicle, the second distance may be selected to correspond to distance F. Thus, when the vehicle's computing devices determine that the client computing device is at or within a distance F from the vehicle, the vehicle's computing device may unlock the vehicle's doors and initiate a trip to the destination as described above.

Again, the first distance may be compared to the first threshold value. If the first distance is less than the first threshold value, the second distance may be selected to be a second value that is smaller than the first value, for example, 3 meters or more or less. Thus, if the client computing device is authenticated within distance E of the vehicle, the second distance may be selected to correspond to distance G from the vehicle. Thus, when vehicle's computing devices determine that the client computing device is at or within a distance G from the vehicle, the vehicle's computing device may unlock the vehicle's doors and initiate a trip to the destination location as described above.

In some cases, the authentication may fail before the user reaches the vehicle. If so, the passenger may select an option on her phone to unlock the vehicle. In one approach, the client computing device may attempt to communicate directly with the vehicle again in order to unlock the doors. Alternatively, a message may be relayed to a concierge or the server computing device which could unlock the doors. However, such an approach requires the vehicle to be within a data zone. If this attempt fails, the passenger may try again. If the vehicle does not unlock the doors within some additional amount of time, the ride may be automatically cancelled.

Figure 10:
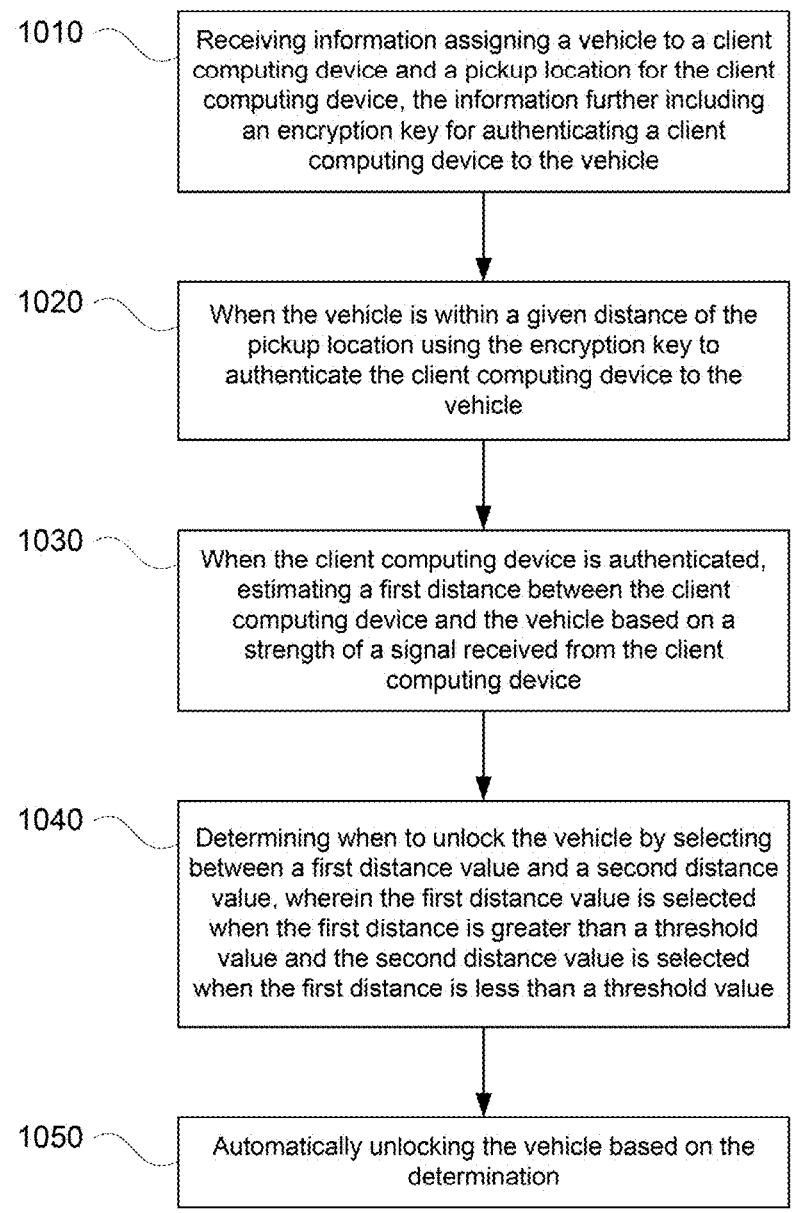
FIG. 10 is an example flow diagram in accordance with aspects of the disclosure.

FIG. 10 is an example flow diagram 1000 in accordance with some of the aspects described above that may be performed by one or more computing devices such as the vehicle's computing device 110. In this example, information assigning a vehicle to a client computing device and a pickup location for the client computing device are received at block 1010. The information includes an encryption key for authenticating a client computing device to the vehicle. When the vehicle is within a given distance of the pickup location using, the encryption key is used to authenticate the client computing device to the vehicle at block 1020. When the client computing device is authenticated, a first distance between the client computing device and the vehicle is estimated based on a strength of a signal received from the client computing device at block 1030. When to unlock the vehicle is then determined by selecting between a first distance value and a second distance value at block 1040. The first value is selected when the first distance is greater than a threshold value and the second value is selected when the first distance is less than a threshold value. The vehicle is automatically unlocked based on the determination.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more computing devices, information assigning a vehicle to a client computing device and a pickup location for the client computing device, the information further including an encryption key for authenticating a client computing device to the vehicle;
when the vehicle is within a given distance of the pickup location using, by the one or more computing devices, the encryption key to authenticate the client computing device to the vehicle;
when the client computing device is authenticated, estimating a first distance, by the one or more computing devices, between the client computing device and the vehicle based on a strength of a signal received from the client computing device;
determining, by the one or more computing devices, when to unlock the vehicle by selecting between a first distance value and a second distance value, wherein the first distance value is selected when the first distance is greater than a threshold value and the second distance value is selected when the first distance is less than a threshold value, and wherein the first distance value is different from the second distance value; and
automatically unlocking the vehicle, by the one or more computing devices, based on the determination.

2. The method of claim 1, wherein the first distance is greater than the threshold value, and the method further comprises:
estimating a second distance, by the one or more computing devices, between the client computing device and the vehicle based on a strength of a signal received from the client computing device after the client computing device is authenticated, wherein the second distance is less than the first distance; and
comparing the second distance to the first distance value, and wherein automatically unlocking the vehicle is further based on the comparison.

3. The method of claim 2, wherein automatically unlocking the vehicle is further based on whether the second distance is less than or equal to the first distance value.

4. The method of claim 1, wherein the first distance is greater than the threshold value, and the method further comprises:
estimating a second distance, by the one or more computing devices, between the client computing device and the vehicle based on a strength of a signal received from the client computing device after the client computing device is authenticated, wherein the second distance is less than the first distance; and
comparing the second distance to the second distance value, wherein automatically unlocking the vehicle is further based on the comparison.

5. The method of claim 4, wherein automatically unlocking the vehicle is further based on whether the second distance is less than or equal to the second distance value.

6. The method of claim 1, wherein the vehicle includes a plurality of directional antennas and estimating the first distance includes identifying an antenna of the plurality that receives strongest signal strength.

7. The method of claim 1, wherein the second distance value is less than the first distance value.

8. The method of claim 1, wherein the information further includes a destination location, and the method further comprises, after automatically unlocking the vehicle, autonomously maneuvering the vehicle to the destination location.

9. A system comprising one or more computing devices configured to:
receive information assigning a vehicle to a client computing device and a pickup location for the client computing device, the information further including an encryption key for authenticating a client computing device to the vehicle;
when the vehicle is within a given distance of the pickup location use the encryption key to authenticate the client computing device to the vehicle;
when the client computing device is authenticated, estimate a first distance between the client computing device and the vehicle based on a strength of a signal received from the client computing device;
determine when to unlock the vehicle by selecting between a first distance value and a second distance value, wherein the first distance value is selected when the first distance is greater than a threshold value and the second distance value is selected when the first distance is less than a threshold value, and wherein the first distance value is different from the second distance value; and
automatically unlock the vehicle based on the determination.

10. The system of claim 9, wherein the first distance is greater than the threshold value, and the one or more computing devices are further configured to:
estimate a second distance between the client computing device and the vehicle based on a strength of a signal received from the client computing device after the client computing device is authenticated, wherein the second distance is less than the first distance; and
compare the second distance to the first distance value, and wherein automatically unlocking the vehicle is further based on the comparison.

11. The system of claim 10, wherein the one or more computing devices are further configured to automatically unlock the vehicle further based on whether the second distance is less than or equal to the first distance value.

12. The system of claim 9, wherein the first distance is greater than the threshold value and the one or more computing devices are further configured to:
   estimate a second distance between the client computing device and the vehicle based on a strength of a signal received from the client computing device after the client computing device is authenticated, wherein the second distance is less than the first distance;
   compare the second distance to the second distance value; and
   automatically unlock the vehicle further based on the comparison.

13. The system of claim 12, wherein the one or more computing devices are further configured to automatically unlock the vehicle further based on whether the second distance is less than or equal to the second distance value.

14. The method of claim 9, wherein the vehicle includes a plurality of directional antennas and the one or more computing devices are further configured to estimate the first distance includes identifying an antenna of the plurality that receives strongest signal strength.

15. The system of claim 9, wherein the second distance value is less than the first distance value.

16. The system of claim 9, wherein the information further includes a destination location, and the one or more computing devices are further configured to, after automatically unlocking the vehicle, autonomously maneuvering the vehicle to the destination location.

17. The system of claim 9, further comprising the vehicle.

18. A tangible, non-transitory recording medium on which instructions are stored, the instructions when executed by one or more processors cause the one or more processors to perform a method, the method comprising:
   receiving information assigning a vehicle to a client computing device and a pickup location for the client computing device, the information further including an encryption key for authenticating a client computing device to the vehicle;
   when the vehicle is within a given distance of the pickup location using the encryption key to authenticate the client computing device to the vehicle;
   when the client computing device is authenticated, estimating a first distance between the client computing device and the vehicle based on a strength of a signal received from the client computing device;
   determining when to unlock the vehicle by selecting between a first distance value and a second distance value, wherein the first distance value is selected when the first distance is greater than a threshold value and the second distance value is selected when the first distance is less than a threshold value, and wherein the first distance value is different from the second distance value; and
   automatically unlocking the vehicle based on the determination.

19. The medium of claim 18, wherein the first distance is greater than the threshold value and the method further comprises:
   estimating a second distance between the client computing device and the vehicle based on a strength of a signal received from the client computing device after the client computing device is authenticated, wherein the second distance is less than the first distance; and
   comparing the second distance to the first distance value, and wherein automatically unlocking the vehicle is further based on the comparison.

20. The medium of claim 19, wherein automatically unlock the vehicle further based on whether the second distance is less than or equal to the first distance value.

\* \* \* \* \*

UNITED STATES PATENT AND TRADEMARK OFFICE
CERTIFICATE OF CORRECTION

| | | |
|---|---|---|
| PATENT NO. | : 9,194,168 B1 | Page 1 of 1 |
| APPLICATION NO. | : 14/550054 | |
| DATED | : November 24, 2015 | |
| INVENTOR(S) | : David Tse-Zhou Lu et al. | |

It is certified that error appears in the above-identified patent and that said Letters Patent is hereby corrected as shown below:

On the title page of the patent item (65) should read --US 2015/0337587 A1   Nov. 26, 2015--

Signed and Sealed this
Twenty-fourth Day of May, 2016

Michelle K. Lee
*Director of the United States Patent and Trademark Office*